United States Patent
Kino

(10) Patent No.: US 8,368,771 B2
(45) Date of Patent: Feb. 5, 2013

(54) GENERATING A SYNTHESIZED IMAGE FROM A PLURALITY OF IMAGES

(75) Inventor: Tatsuya Kino, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 106 days.

(21) Appl. No.: 12/973,547

(22) Filed: Dec. 20, 2010

(65) Prior Publication Data

US 2011/0149106 A1      Jun. 23, 2011

(30) Foreign Application Priority Data

Dec. 21, 2009   (JP) ................................. 2009-288853

(51) Int. Cl.
  *H04N 5/225*   (2006.01)
(52) U.S. Cl. ............... 348/221.1; 348/220.1; 348/222.1; 348/362; 348/216.1
(58) Field of Classification Search ............... 348/220.1, 348/222.1, 362, 221.1, 216.1
  See application file for complete search history.

(56) References Cited

U.S. PATENT DOCUMENTS

2008/0253758 A1\* 10/2008 Yap et al. ...................... 396/234
2009/0103621 A1\* 4/2009 Numata et al. ........... 375/240.16
2010/0026825 A1   2/2010 Doida

FOREIGN PATENT DOCUMENTS

JP       2008-181196 A      8/2008

\* cited by examiner

*Primary Examiner* — Sinh Tran
*Assistant Examiner* — Paul Berardesca
(74) *Attorney, Agent, or Firm* — Volpe and Koenig, P.C.

(57) ABSTRACT

A plurality of images is captured, and a positional displacement between the images is determined. The images may be captured as still images or as moving images. Moving images may include, for example, images that are captured as part of the recording of a video or as live image data that is played back in real time. Different positional displacement techniques are be used to determine the positional displacement between the images, based on how the images are captured. For example, a first positional displacement technique may be used if the images are still images and a second positional displacement technique if the images are moving images. The images may then be synthesized images based on the determined positional displacement of the images to generate a synthesized image. The images may be synthesized using a weighted synthesis technique, a simple synthesis technique, or other appropriate synthesis technique.

14 Claims, 11 Drawing Sheets

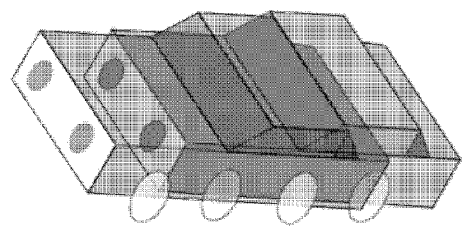 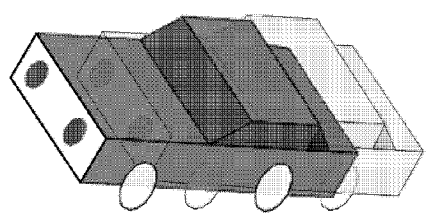
FIG. 9(a)     FIG. 9(b)
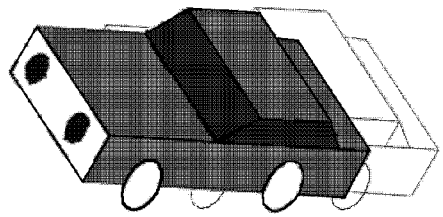
FIG. 9(c)

GENERATING A SYNTHESIZED IMAGE FROM A PLURALITY OF IMAGES

CROSS-REFERENCE TO RELATED APPLICATION

This application claims benefit of Japanese Patent Application No. 2009-288853 filed in Japan on Dec. 21, 2009, which is hereby incorporated by reference as if fully set forth herein.

TECHNICAL FIELD

The subject matter disclosed herein relates to techniques for generating a synthesized image from a plurality of images.

BACKGROUND

Techniques for generating a synthesized image with an extended dynamic range from a group of images are known. According to these techniques, a low-resolution image and a high-resolution image obtained under different exposure conditions are synthesized after correcting for positional shifts in the images. Such techniques are described in, for example, Japanese Unexamined Patent Application Publication No. 2008-181196.

These techniques for generating a synthesized image may vary in their complexity, in the amount of processing time they require, and in the level of quality in the images that they produce. Typically, techniques which require more processing time produce higher-quality and more reliable results, while faster techniques may produce lower-quality results. Current technologies, however, do not adequately distinguish between when faster techniques or slower techniques should be used, and synthesis techniques may be used that are inappropriate for the requirements of a given context. Accordingly, new technologies are required that address these shortcomings of the current techniques.

SUMMARY

An image capturing apparatus for generating a synthesized image from a first image and a second image obtained by continuous image-capturing includes a displacement detection unit, an image-capturing mode determination unit, a control unit, and a synthesis unit. The image-capturing mode determination unit determines whether the first image and the second image were captured in a still image mode. The control unit directs the displacement detection unit to detect a positional displacement between the first image and the second image, based on whether the first image and the second image were captured in a still image mode. When the images were captured in a still image mode, the control unit directs the displacement detection unit to detect the positional displacement using a first displacement detection method. When the images were not captured in a still image mode, the control unit directs the displacement detection unit to detect the positional displacement using a second displacement detection method that is different from the first displacement detection method. The synthesis unit generates the synthesized image by synthesizing the first image and the second image based on the detected positional displacement.

A method for generating a synthesized image from a first image and a second image obtained by continuous image-capturing, includes an image sensor capturing the first image and the second image, and includes determining whether the first image and the second image were captured in a still image mode. The method further includes detecting a positional displacement between the first image and the second image. The detecting is performed using a first displacement detection method when the first image and the second image were captured in a still image mode, and is performed using a second displacement detection method when the first image and the second image were not captured in a still image mode. The method further includes generating the synthesized image by synthesizing the first image and the second image based on the detected positional displacement.

A computer-readable medium has processor-executable instructions stored thereon which, when executed by a processor, will cause the processor to perform a method for generating a synthesized image from a first image and a second image obtained by continuous image-capturing. The method includes the processor determining whether the first image and the second image were captured in a still image mode. The method further includes the processor detecting a positional displacement between the first image and the second image. The detecting is performed using a first displacement detection method when the first image and the second image were captured in a still image mode, and is performed using a second displacement detection method when the first image and the second image were not captured in a still image mode. The method further includes the processor generating the synthesized image by synthesizing the first image and the second image based on the detected positional displacement.

BRIEF DESCRIPTION OF THE DRAWINGS

A more detailed understanding may be had from the following description, given by way of example in conjunction with the accompanying drawings wherein:

FIG. 9 shows examples of synthesized images generated using different synthesis ratios;

DETAILED DESCRIPTION

First Embodiment

Figure 1:
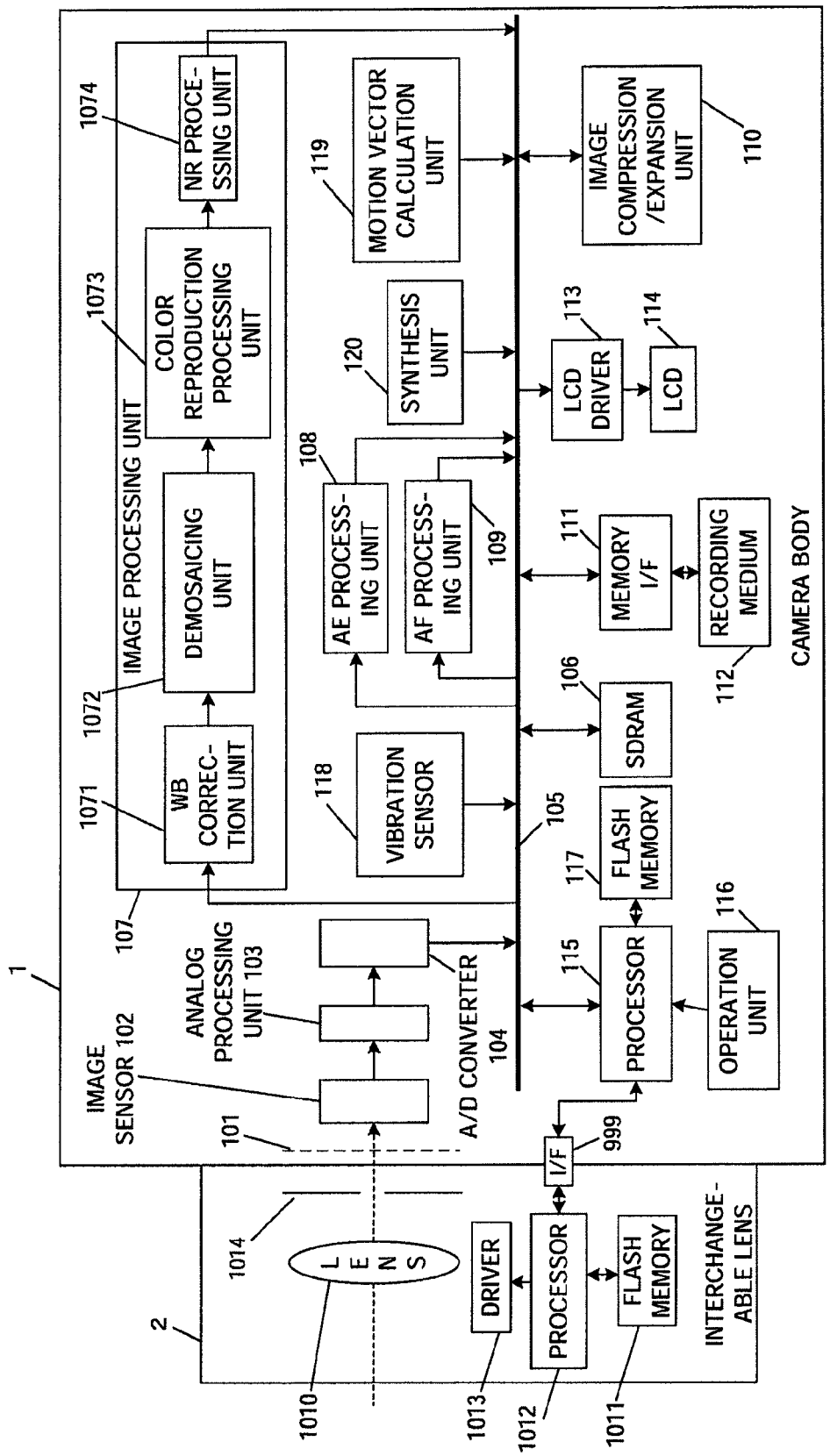
FIG. 1 shows a structure of a digital still camera as an image capturing apparatus according to a first embodiment.

FIG. 1 is a diagram illustrating a structure of a digital camera according to the first embodiment. The digital camera shown in FIG. 1 includes a camera body 1 and an interchangeable lens 2.

The interchangeable lens 2 includes a lens 1010, a flash memory 1011, a processor 1012, a driver 1013 and an aperture 1014. The interchangeable lens 2 is connected to the camera body 1 via a lens interface (I/F) 999, and the interchangeable lens 2 and the camera body 1 may communicate via the lens I/F 999.

The camera body 1 includes a mechanical shutter 101, an image sensor 102, an analog processing unit 103, an analog/digital (A/D) converter 104, a bus 105, an SDRAM 106, an image processing unit 107, an Auto Exposure (AE) processing unit 108, an Auto Focus (AF) processing unit 109, an image compression/expansion unit 110, a memory interface (I/F) 111, a recording medium 112, an LCD driver 113, an LCD 114, a processor 115, an operation unit 116, a flash memory 117, a vibration sensor 118, a motion vector calculation unit 119 and a synthesis unit 120.

The lens 1010 collects light of an object as an optical image on the image sensor 102. The lens 1010 may be a single focal length lens or a zoom lens.

The processor 1012, which is connected to the lens I/F 999, the flash memory 1011 and the driver 1013, reads and writes information stored in the flash memory 1011 and controls the driver 1013. Further, the processor 1012 is capable of communicating with the processor 115 via the lens I/F 999. The processor 1012 sends information on a focal length of a lens and the like to the processor 115 and receives information of an aperture value and the like from the processor 115.

In response to a command from the processor 1012, the driver 1013 changes focal lengths and focus positions by driving the lens 1010, and drives the aperture 1014. The aperture 1014 is provided near the lens 1010 and adjusts the amount of light of the object.

The mechanical shutter 101 is driven in response to a command from the processor 115 and controls exposure time of the image sensor 102 for capturing the object.

The image sensor 102 includes photodiodes, which constitute photodiode pixels. The image sensor 102 also includes a Bayer patterned color filter in front of the photodiodes. A Bayer pattern consists of horizontal rows consisting of alternating R pixels and G (Gr) pixels and rows consisting of alternating G (Gb) pixels and B pixels, wherein these two types of rows are alternated in the vertical direction. By receiving and converting photoelectrically light collected by the lens 1010 via the photodiodes, the image sensor 102 outputs an amount of the light as a charge amount to the analog processing unit 103. The image sensor 102 may be of Complementary Metal Oxide Semiconductor (CMOS) type or Charged Coupled Device (CCD) type.

After reducing reset noises and the like for an electrical signal (such as an analog image signal) read out from the image sensor 102, the analog processing unit 103 performs waveform shaping and further increases gain to obtain a desired brightness. The A/D converter converts the analog image signal outputted from the analog processing unit 103 into digital image data.

The bus 105 provides a transmission path for transferring various data generated in the digital camera to each portion of the digital camera. The bus 105 is connected to the A/D converter 104, the SDRAM 106, the image processing unit 107, the AE processing unit 108, the AF processing unit 109, the image compression/expansion unit 110, the memory I/F 111, the LCD driver 113, the processor 115, the vibration sensor 118, the motion vector calculation unit 119 and the synthesis unit 120.

The image data outputted from the A/D converter 104 is temporarily recorded in the SDRAM 106 via the bus 105. The SDRAM 106 temporarily records data, such as image data obtained from the A/D converter 104 or data processed by the image processing unit 107, the image compression/expansion unit 110, and the synthesis unit 120.

The image processing unit 107, which includes a white balance (WB) correction unit 1071, a demosaicing unit 1072, a color reproduction processing unit 1073 and a noise reduction (NR) processing unit 1074, performs various image-processing of the image data read out from the SDRAM 106. The WB correction unit 1071 corrects the white balance of the image data. The demosaicing unit 1072 demosaics a Bayer pattern image data into image data that includes R, G and B information for each pixel. The color reproduction processing unit 1073 performs the color reproduction process for changing a color tone of the image. The NR processing unit 1074 reduces noise of the image. After the noise reduction process, the image is recorded in the SDRAM 106.

The vibration sensor 118 detects motions of the camera body 1. The vibration sensor 118 may detect motion that is due to, for example, shaking of the camera body 1. The motion vector calculation unit 119 calculates motion vectors based on a plurality of images obtained by continuous shooting. A detailed configuration of the motion vector calculation unit 119 is described below with reference to FIG. 2.

The synthesis unit 120 synthesizes the plurality of the images obtained by the continuous shooting. In particular, the synthesis unit 120 generates a synthesized image with extended dynamic range by synthesizing image data shot with an exposure time shorter than the standard exposure time that would be used given the current object brightness and an image shot with an exposure time longer than the standard exposure time for the object brightness.

The AE processing unit 108 calculates object brightness from the image data. The data for calculating the object brightness may be an output of a special photometry sensor. The AF processing unit 109 extracts a high frequency component signal from the image data and obtains a focus evaluation value for evaluating a level of focus produced by an AF integration process.

When recording image data for a still image, the image compression/expansion unit 110 reads out the image data from the SDRAM 106 and compresses this data according to the Joint Photographic Experts Group (JPEG) compression format and records the compressed JPEG image data temporarily in the SDRAM 106. The processor 115 creates a JPEG file by adding JPEG header required for configuring the JPEG file to this JPEG image data and records the created JPEG file in the recording medium 112 via the memory I/F 111.

When recording movie data, the image compression/expansion unit 110 reads out image data from the SDRAM 106, compresses the read-out data, and records the compressed video data in the recording medium 112 via the memory I/F 111. The image compression/expansion unit may compress the data to a format such as H.264, or any other appropriate format. Further, the image compression/expansion unit 110 expands compressed data in response to a command from the processor 115.

The recording medium 112 may be, for example, a semiconductor memory, or any other appropriate type of recording medium. The recording medium 112 may inserted into and removed from the digital camera body 1, or permanently included in the digital camera body 1.

Images are displayed on the LCD 114 by the LCD driver 113. The images displayed on the LCD 114 by the LCD driver 113 may include "rec view" images (images which are displayed for a short time immediately after being taken), images from a playback display of a JPEG file recorded in the recording medium 112, images for displaying a movie (which may be a live view display), or other images. When playing back compressed data recorded in the recording medium 112, the image compression/expansion unit 110 reads out and expands the compressed data recorded in the recording medium 112 and stores the expanded data temporarily in the SDRAM 106. The LCD driver 113 reads out the expanded data from the SDRAM 106 and converts the read-out data into video signals and outputs the video signals to the LCD 114 for display.

The processor 115 serves as a control unit and controls various operations of the digital camera body 1. The processor 115 is connected to the operation unit 116 and the flash memory 117.

The operation unit 116 includes components (not depicted) such as power button, release button, entry keys and the like. When a component in the operation unit 116 is selected by the user, the processor 115 executes a sequence corresponding to the component. The power button controls whether power in the digital camera is on or off. When the power button is pressed, the camera turns on. When the power button is pressed again, the camera turns off. The release button includes a two-stage switch consisting of a first release switch and a second release switch. When the release button is pressed halfway, that is, the first release switch turns on, the processor 115 performs a shooting preparation sequence including AE processing and AF processing. Then, when the release button is pressed all the way (i.e., the second release switch turns on), the processor 115 performs a shooting sequence for shooting an image.

White balance correction values, low pass filter coefficients, various parameters necessary for digital camera operations, a serial number to identify the digital camera and the like are stored in the flash memory 117. Further, various programs executed by the processor 115 are stored in the flash memory 117. In accordance with such a program stored in the flash memory 117, the processor 115 reads out the necessary parameters for a sequence from the flash memory 117 and executes the sequence.

Figure 2:
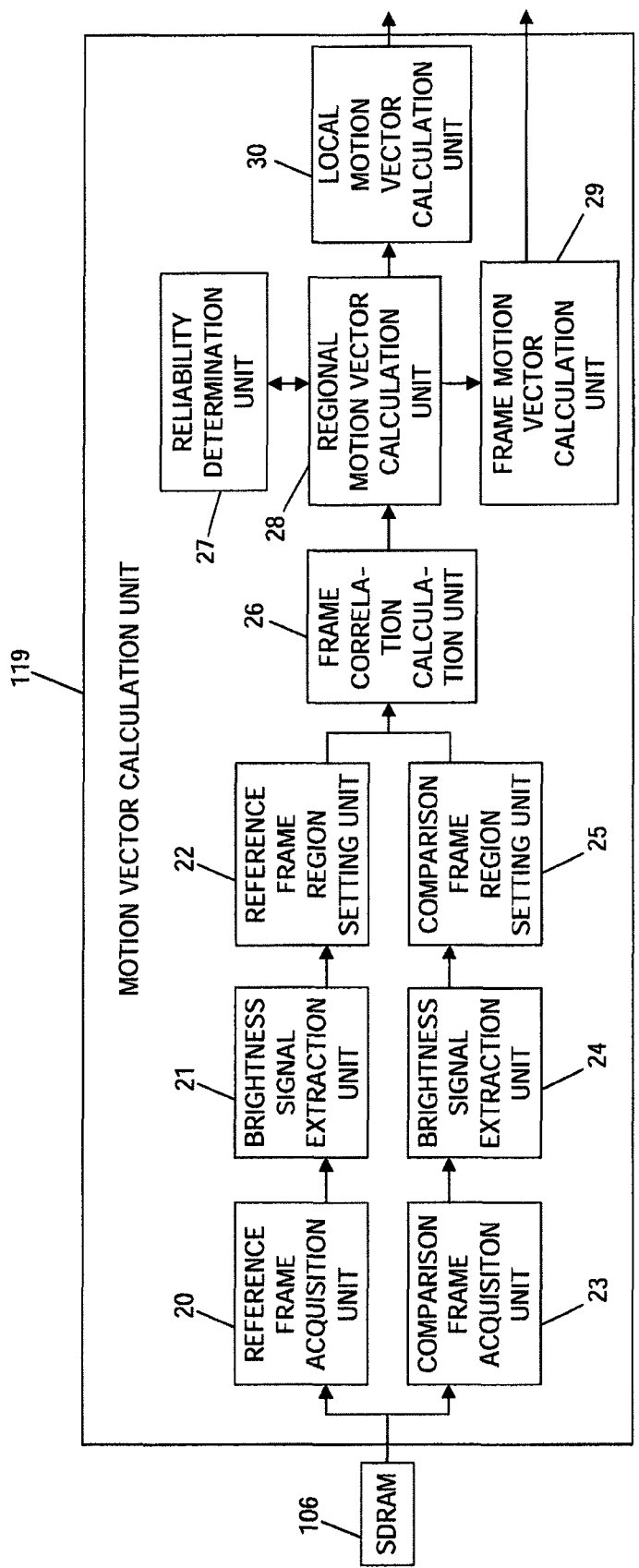
FIG. 2 shows the structure of a motion vector calculation unit.

FIG. 2 is a diagram illustrating the detailed structure of the motion vector calculation unit 119. The motion vector calculation unit 119 comprises a reference frame acquisition unit 20, a brightness signal extraction unit 21, a reference frame region setting unit 22, a comparison frame acquisition unit 23, a brightness signal extraction unit 24, a comparison frame region setting unit 25, a frame correlation calculation unit 26, a reliability determination unit 27, a regional motion vector calculation unit 28, a frame motion vector calculation unit 29 and a local motion vector calculation unit 30.

In the SDRAM 106, image data for at least two images shot continuously are stored. As an example, a first image may be shot with an exposure time shorter than the standard exposure time corresponding to the current object brightness, while a second image may be shot with an exposure time longer than the standard exposure time. The reference frame acquisition unit 20 reads out data for a reference image for calculating motion vectors from the image data stored in the SDRAM 106. The data for the reference image may be the data for either one of the two images. The data to be used for the reference image is referred to as a "reference frame."

The brightness signal extraction unit 21 extracts the brightness signal of the reference frame obtained by the reference frame acquisition unit 20.

The reference frame region setting unit 22 divides the reference frame obtained by the reference frame acquisition unit 20 into blocks of a predetermined size and sets regions of a predetermined size as motion vector calculation regions.

Figure 3A:
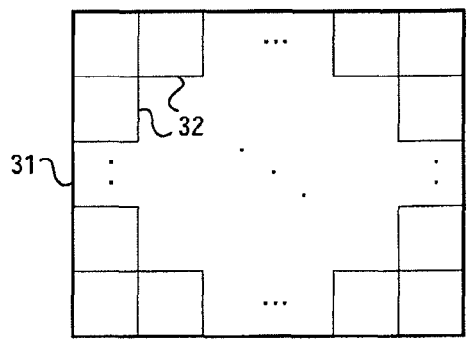
FIG. 3(a) through FIG. 3(h) show a method for calculating motion vectors for an entire frame.

FIG. 3(a) shows an example of a reference frame 31 divided into a plurality of blocks 32 by the reference frame region setting unit 22. FIG. 3(c) shows an example of motion vector calculation regions 35 set in one of the blocks 32 by the reference frame region setting unit 22. The motion vector calculation regions 35 are set in all of the blocks 32 in the reference frame.

The comparison frame acquisition unit 23 reads out data from the SDRAM 106 to be compared with the reference frame. The data read out from the SDRAM 106 may the image data corresponding to the first image or the second image described above as stored in the SDRAM 106. This image data is to be synthesized with the reference frame. Here, the image data to be compared with the reference frame is referred to as the "comparison frame."

The brightness signal extraction unit 24 extracts the brightness signals of the comparison frame obtained by the comparison frame acquisition unit 23.

The comparison frame region setting unit 25 divides the comparison frame obtained by the comparison frame acquisition unit 23 into blocks of a predetermined size and sets the divided blocks as comparison regions to be compared with the motion vector calculation regions. The size of the blocks dividing the comparison frame may be same as the size of the blocks dividing the reference frame.

Figure 3B:
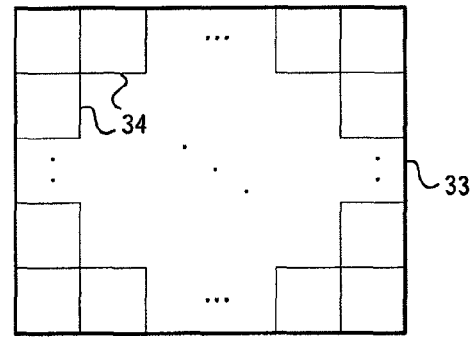
Figure 3C:
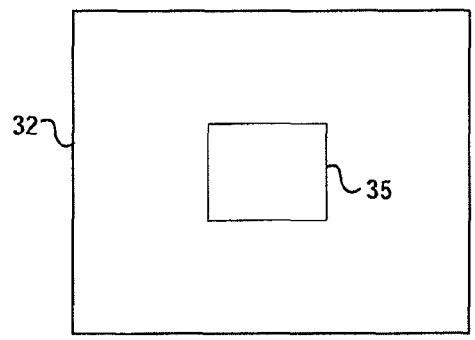
Figure 3D:
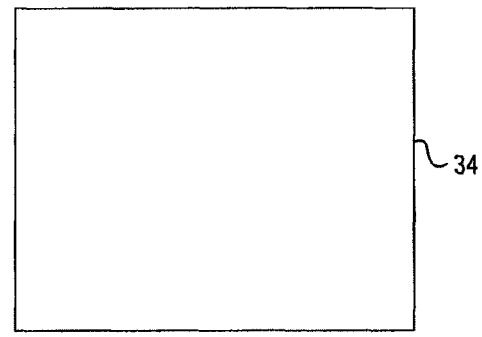

FIG. 3(b) illustrates an example of the comparison frame 33 divided into a plurality of blocks 34 by the comparison frame region setting unit 25. FIG. 3(d) illustrates a comparison region 34.

Figure 3E:
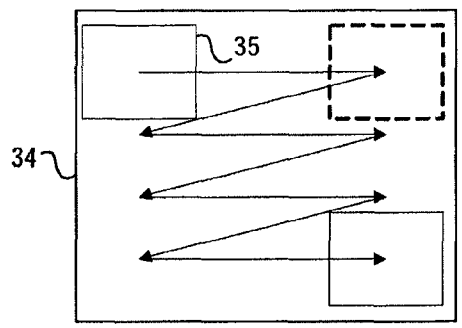

The frame correlation calculation unit 26 obtains correlations between blocks 32 in the reference frame 31 and the comparison frame 33. Here, a correlation coefficient value is calculated by scanning the motion vector calculation region 35 in a block 32 in the reference frame 31 within the comparison region 34 in the comparison frame 33, whose position corresponds to the block 32 in the reference frame 31. FIG. 3(e) illustrates this scanning of the motion vector calculation region 35 in the comparison region 34 in the comparison frame 33. A SAD (Sum of Absolute intensity Differences) may be calculated, for example, as the correlation coefficient value. The SAD is a sum of absolute values of differences between pixel values of each pixel in the motion vector calculation region 35 and pixel values of each pixel in the region to be compared with the motion vector calculation region 35 in the comparison region 34. Smaller values for the SAD indicate a higher correlation; the smaller the SAD value, the higher the correlation.

Figure 3F:
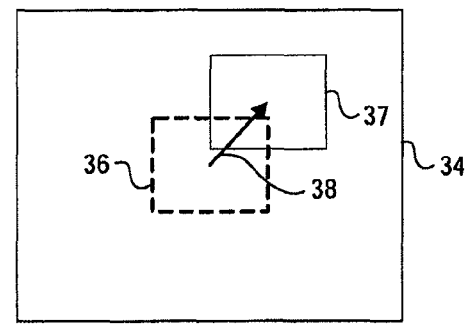

The regional motion vector calculation unit 28 determines a region with the smallest correlation coefficient value among the correlation coefficient values calculated by the frame correlation calculation unit 26 as the destination region of the motion vector calculation region 35. It then determines the displacement amount as the motion vector of the block 32 in which the motion vector calculation region 35 lies. FIG. 3(f) illustrates an example of a motion vector 38 from a region 36 in the comparison region 34, corresponding to the motion vector calculation region 35, to a range 37 with the smallest correlation value.

Figure 3G:
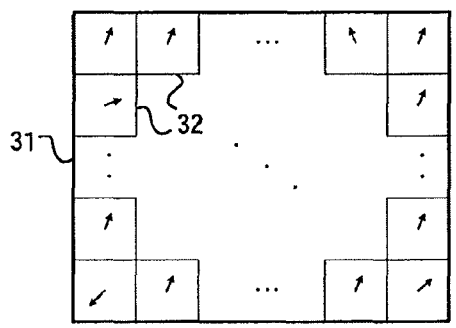

Motion vectors in all blocks divided by the reference frame region setting unit 22 are calculated as described above. FIG. 3(g) illustrates an example of calculated motion vectors in all blocks.

The reliability determination unit 27 determines reliability of the motion vectors in each block calculated by the regional motion vector calculation unit 28. For example, the reliability determination unit 27 may determine that the reliability of the motion vectors is low when the correlation coefficient value calculated for obtaining the motion vectors is equal to or greater than a predetermined threshold value, and that the reliability of the motion vectors is high when the correlation coefficient value is less than the predetermined threshold value. Alternatively or additionally, the reliability determination unit 27 may determine the reliability of the motion vectors using any other appropriate method. For example, the reliability determination unit 27 may determine the reliability of the motion vectors using a process that includes three or more phases, as an alternative to the two-phase process described above.

Figure 3H:
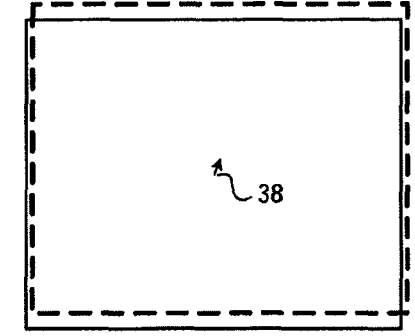

The frame motion vector calculation unit 29 calculates the motion vector of an entire frame based on the motion vectors of each block calculated by the regional motion vector calculation unit 28 and the reliabilities determined by the reliability determination unit 27. Here, an average of motion vectors excluding motion vectors whose reliability was determined to be low is those taken as the motion vector of the entire frame. FIG. 3(h) illustrates an example of a frame motion vector 38.

Alternatively, the motion vector of the entire frame may be obtained by calculating a weighted average of all motion vectors, whereby a low weight is assigned to a motion vector whose reliability has been determined to be low and a high weight is assigned to a motion vector whose reliability has been determined to be high.

The local motion vector calculation unit 30 calculates motion vectors of each pixel based on the motion vectors calculated by the regional motion vector calculation unit 28 by cubic interpolation and related techniques. For the cubic interpolation, the motion vector of a target pixel is calculated by using sixteen motion vectors neighboring the target pixel.

Figure 4:
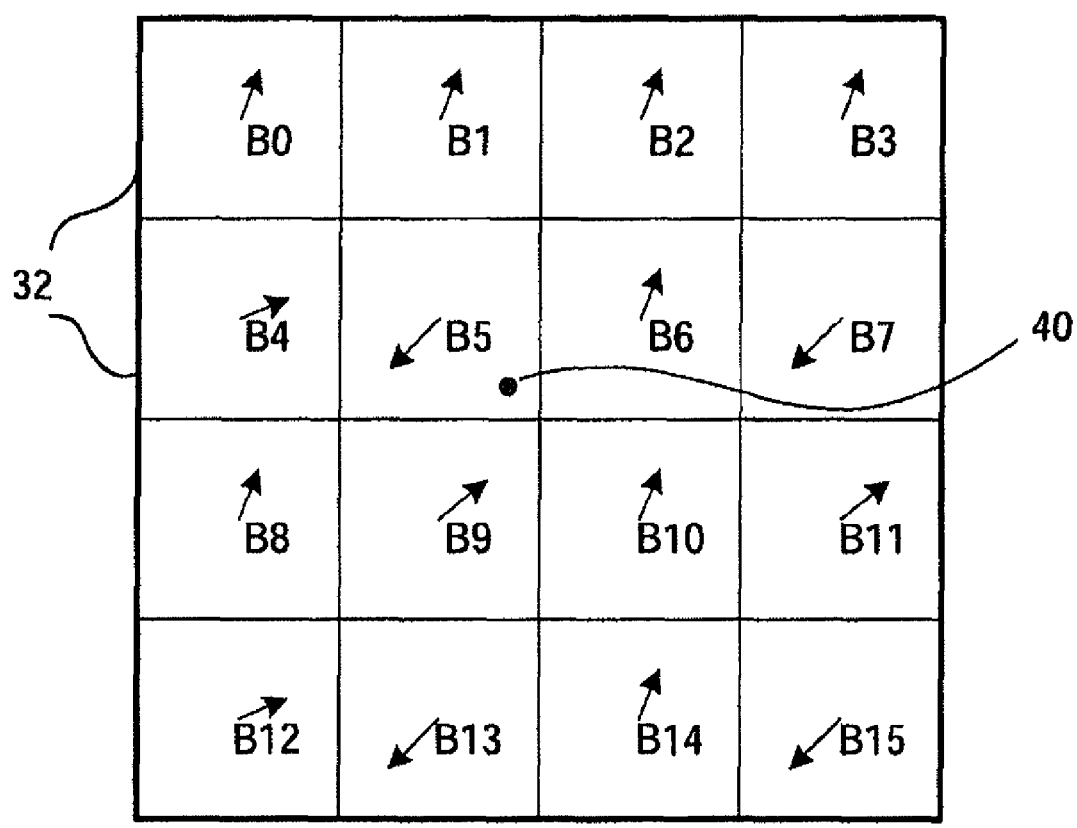
FIG. 4 shows an example of motion vectors neighboring a target pixel.

FIG. 4 shows an example of sixteen motion vectors B0 through B15 neighboring a target pixel 40. A motion vector $B_{out}$ of the target pixel 40 is obtained by interpolation according to the following equation (1). In the equation (1), $K_{x0}$, $K_{x1}$, $K_{x2}$, $K_{x3}$, $K_{y0}$, $K_{y1}$, $K_{y2}$ and $K_{y3}$ are interpolation coefficients which are determined corresponding to the position coordinates of the target pixel 40.

$$B_{out} = K_{x0}(K_{y0} \times B0 + K_{y1} \times B4 + K_{y2} \times B8 + K_{y3} \times B12) + K_{x1}(K_{y0} \times B1 + K_{y1} \times B5 + K_{y2} \times B9 + K_{y3} \times B13) + K_{x2}(K_{y0} \times B2 + K_{y1} \times B6 + K_{y2} \times B10 + K_{y3} \times B14) + K_{x3}(K_{y0} \times B3 + K_{y1} \times B7 + K_{y2} \times B11 + K_{y3} \times B15) \quad (1)$$

The local motion vector calculation unit 30 calculates motion vectors of all pixels in the comparison frame 31 using the above-described method. Here, the motion vectors for each pixel may be referred to as the "local motion vectors" for each pixel. Processing time for calculating the local motion vectors is longer than for calculating only a single motion vector for the entire frame, because calculating the local motion vectors includes calculating the motion vectors for all of the pixels in the comparison frame 31. However, calculation accuracy of the local motion vectors is higher than that of the frame motion vector.

In addition or as an alternative to the local motion vectors described above (which each relate to a single pixel), the local motion vector calculation unit 30 may calculate local motion vectors for groups of contiguous pixels. In such an instance, the local motion vector calculation unit 30 may calculate local motion vectors for the comparison frame 31 using the techniques described above with respect to the single-pixel motion vectors, modified, however, to use local motion vectors that represent motion with respect to groups of pixels. Local motion vectors may represent motion with respect to groups of pixels of, for example, four contiguous pixels, or any other appropriate size.

Figure 5:
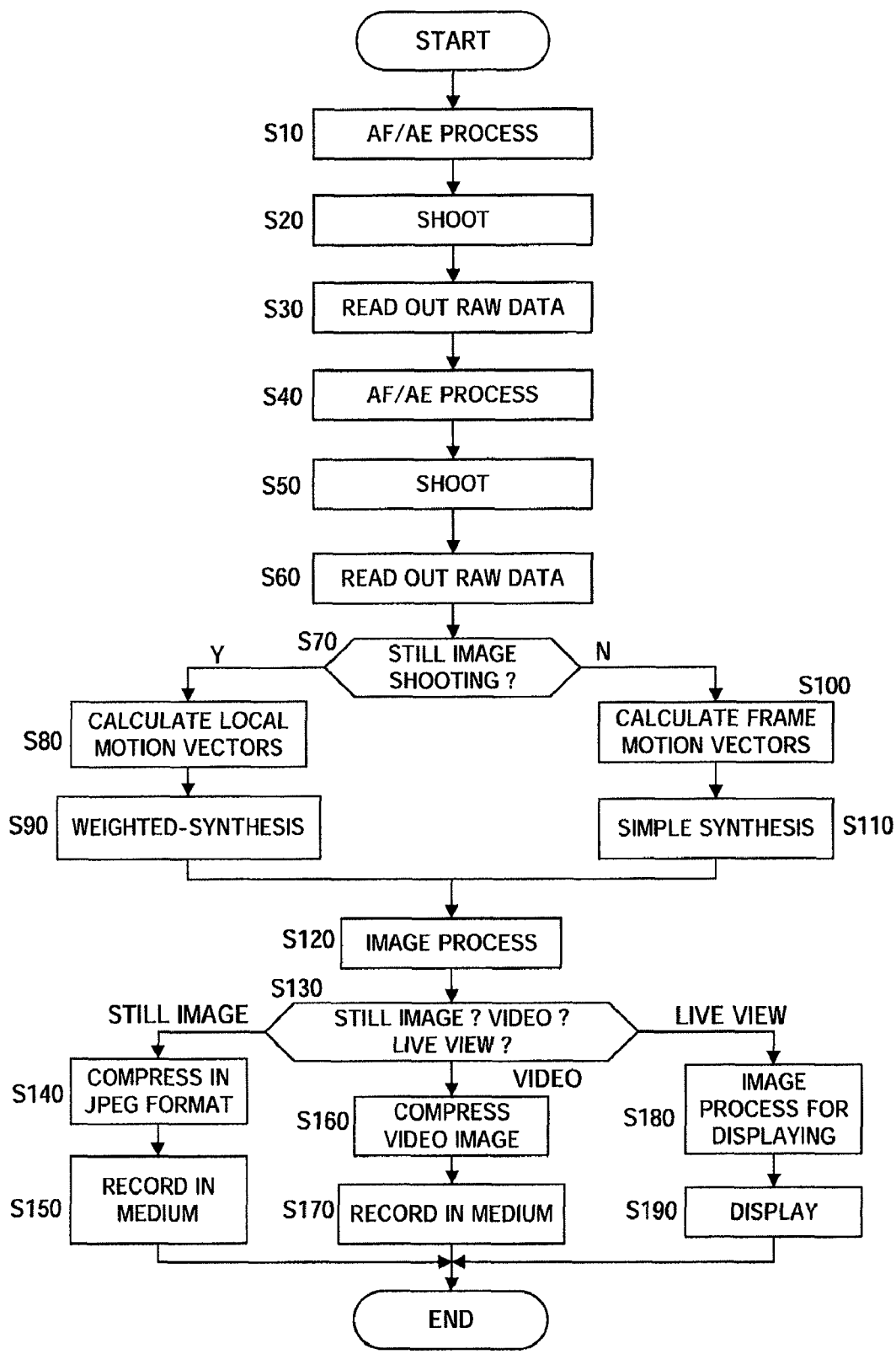
FIG. 5 shows a procedure for generating a synthesized image performed by the image capturing apparatus according to the first embodiment.

FIG. 5 shows a procedure for generating a synthesized image by the digital camera of the first embodiment. The digital camera generates a synthesized image with extended dynamic range by synthesizing image data shot with an exposure time shorter than the standard exposure time corresponding to the current object brightness and an image shot with an exposure time longer than the standard exposure time.

At step S10, AF processing and the AE processing are performed. This begins with the AF processing unit 109 calculating a focus evaluation value. The processor 115 sends a command to the driver 1013 based on the focus evaluation value to drive the lens 1010. In response to the command, the driver 1013 drives the lens 1010 and changes focal lengths and focus positions. For the AE processing, the processing unit 108 calculates the object brightness, whereupon the ISO speed, aperture and shutter speed for shooting are determined based on the calculated object brightness by referring to an exposure condition determination table recorded in the flash memory 117. This exposure condition determination table used in step S10 indicates a shutter speed faster than the standard shutter speed that would be used with the calculated object brightness.

At step S20, shooting is performed. In response to the command from the processor 1012, the driver 1013 drives the aperture 1014 to the set aperture value. Subsequently, the shooting is performed by controlling the mechanical shutter 101 based on a determined shutter speed. Image data corresponding to the set ISO speed is obtained. This image data is referred to as the "first image data." As described above, since the shutter speed set at step S10 is faster than the standard shutter speed for the current conditions, shooting is performed with an exposure time shorter than the standard exposure time.

At step S30, the synthesis processing unit 120 reads out the first image data obtained by the shooting at step S20 (RAW data) from the SDRAM 106.

At step S40, the AF processing and the AE processing are performed again for shooting under different exposure conditions. The same AF process is performed as that of step S10, but for the AE process, an exposure condition determination table is used which provides a slower shutter speed than the standard shutter speed that would be used with the current object brightness.

At step S50, shooting is performed. As described above, the shooting is performed with longer exposure time than the standard exposure time corresponding to the current object brightness, since the shutter speed set at step S40 is slower than the standard shutter speed. The image data obtained by the shooting is referred to as the "second image data."

At step S60, the synthesis processing unit 120 reads out the second image data obtained by the shooting at step S50 (RAW data) from the SDRAM 106.

At step S70, it is determined whether still image shooting was performed. The determination is made based on whether the still image mode was selected by the operation unit 116. When the operation is still image shooting, the process proceeds to step S80.

At step S80, a displacement detection method may be performed to determine the positional displacement between the first image data read at step S30 and the second image data read out at step S60. This displacement detection method may be performed by the local motion vector calculation unit 30 in the motion vector calculation unit 119, and may include calculating local motion vectors between the first image data and the second image data.

At step S90, the first image data and the second image data are synthesized. Here, the positional displacements between the first image data and the second image data are corrected (i.e., the images are aligned) based on the local motion vectors calculated at step S80. Then, the aligned first image data and second image data are synthesized using a weighted synthesis technique. Further details regarding how the weighted synthesis technique is performed are provided below with reference to FIG. 6.

On the other hand, when it is determined at step S70 that a moving image is shot rather than a still image, the process goes to step S100. Moving image shooting includes shooting in a movie mode (whereby movie data is recorded in the recording medium 112) or shooting in a live view display mode by which moving images are displayed on the LCD 114 in real time.

At step S100, a displacement detection method may be performed to determine a displacement between the first image data read at step S30 and the second image data read out at step S60. This displacement detection method is different from the displacement detection method described above as performed in step S80. This displacement detection method may be performed by the frame motion vector calculation unit 29 in the motion vector calculation unit 119, and may include calculating the motion vector of the entire frame between the first image data and the second image data.

At step S110, the first image data and the second image data are synthesized. Here, the positional displacement between the first and the second image data is corrected (i.e., the first and second image data are aligned) based on the frame motion vector calculated at step S100. Subsequently, a simple synthesis, i.e., a synthesis with an equal ratio (synthesis ratio α=0.5), of the first image data and the second image data after correcting the positional displacement is performed. The detailed process of synthesizing the image data after correcting the positional displacement based on the motion vector of the entire frame is described below with reference to FIG. 10.

At step S120, the image processing unit 107 performs various image-processing such as white balance correction, demosaicing, color reproduction and noise reduction for the synthesized image data.

At step S130, it is determined whether the synthesized image is related to a still image, a video, or is live view image data for display on the LCD 114. Here, the moving image data is the data to be recorded in the recording medium 112. When it is determined that the synthesized image relates to a still image, the process proceeds to step S140.

At step S140, the image compression/expansion unit 110 compresses the synthesized image data according to the JPEG compression format. At step S150, after adding the necessary JPEG header for configuring a JPEG file to the compressed image data, the compressed image data is recorded in the recording medium 112 via the memory I/F 111.

At step S130, when it is determined that the synthesized image is related to video data, the process proceeds to step S160. At step S160, the image compression/expansion unit 110 compresses the synthesized image data according to a predetermined compression format for moving images. At step S170, after adding a necessary header for configuring a video file to the compressed image data, the compressed image data is recorded in the recording medium 112 via the memory I/F 111.

At step S130, when it is determined that the synthesized image is live view image data, the process proceeds to step S180. At step S180, the synthesized image data is processed according to image processing for the live view display, such as changing the image size to a size for the live view display. At step S190, the image data after processing for the live view display is displayed on the LCD 114.

Figure 6:
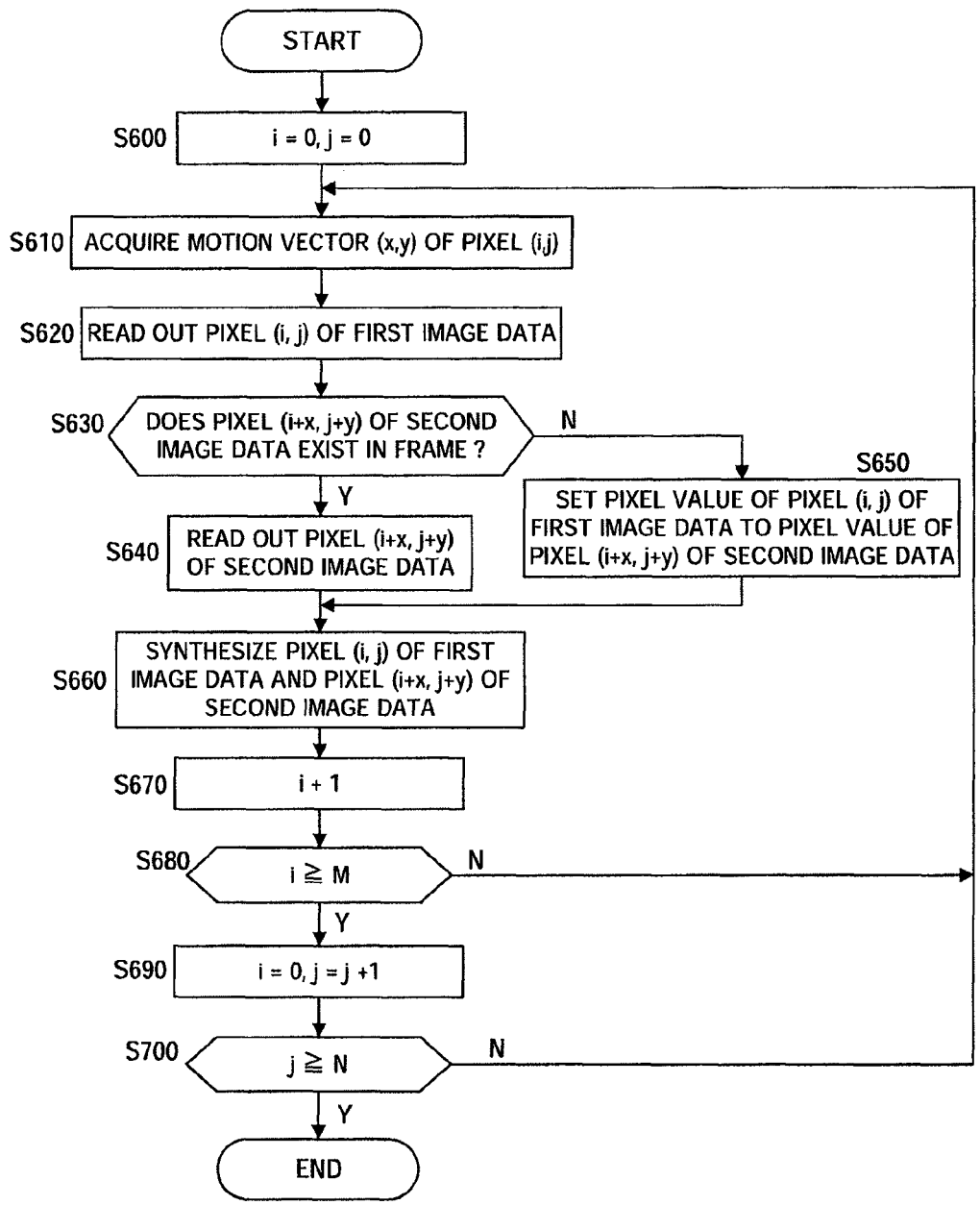
FIG. 6 shows details of the image data synthesis after a positional displacement correction is performed based on local motion vectors.

FIG. 6 shows the process of step S90 in FIG. 5, that is, the detailed process of synthesizing the image data after aligning the images based on the local motion vectors. At step S600, parameters i and j, which indicate position coordinates of a pixel to be processed, are initialized and set to zero. The parameter i is the position coordinate in the x-axis direction and the parameter j is the position coordinate in the y-axis direction.

At step S610, a motion vector (x, y) of a pixel (i, j) is acquired. For example, the motion vectors of each pixel calculated by the local motion vector calculation unit 30 in the motion vector calculation unit 119 are recorded in the SDRAM 106 and the motion vector (x, y) of the pixel (i, j) is read out from the SDRAM 106.

At step S620, the pixel value of the pixel (i, j) is read from the first image data.

At step S630, it is determined whether a pixel (i+x, j+y), i.e., the pixel (i, j) shifted by an amount of the motion vector (x, y) on the second image data, exists within the second image data. When the pixel (i+x, j+y) exists within the second image data, the process proceeds to step S 640. On the other hand, when the pixel (i+x, j+y) does not exist within the second image data, the process proceeds to step S650.

At step S640, the pixel value of the pixel (i+x, j+y) is read out from the second image data.

On the other hand, at step S650, the pixel value of the pixel (i, j) of the first image is set to the pixel value of the pixel (i+x, j+y) of the second data.

At step S660, the pixel (i, j) of the first image data and the pixel (i+x, j+y) of the second image data are synthesized. As described above, at step S90 in FIG. 6, a weighted synthesis is performed. The detailed process of the weighted synthesis will be described in further detail below with reference to FIG. 7.

Figure 7:
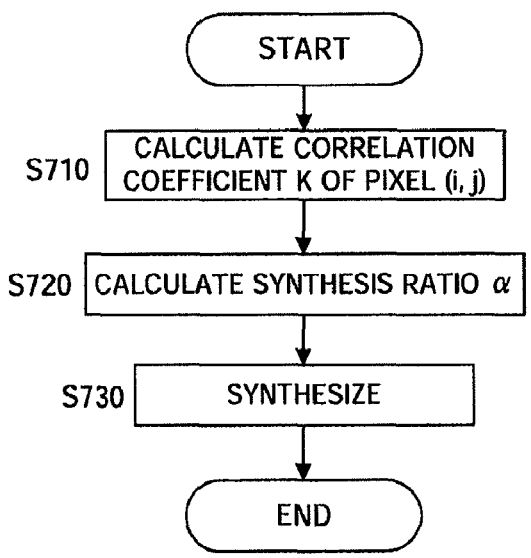
FIG. 7 shows a weighted-synthesis process.

At step S710 in FIG. 7, a correlation coefficient K of the pixel (i, j) to be processed is calculated. That is, the absolute value of differences between the value of the pixel (i, j) of the first image data and the value of the pixel (i+x, j+y) of the second image data is calculated as the correlation coefficient K.

At step S720, the synthesis ratio α is calculated based on the correlation coefficient K calculated at step S710.

Figure 8:
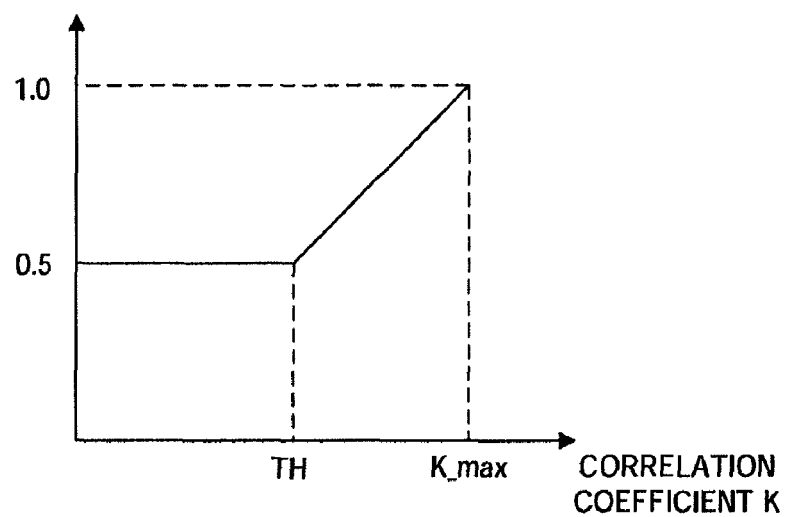
FIG. 8 shows the relationship between correlation coefficient K and synthesis ratio $\alpha$.

The chart in FIG. 8 shows the relationship between the correlation coefficient K and the synthesis ratio α. In FIG. 8, TH is a predetermined threshold value and K_max is the maximum value of the correlation coefficient K. As shown in FIG. 8, the synthesis ratio α is 0.5 when the correlation coefficient K is equal to or smaller than the predetermined threshold value TH and it is greater than 0.5 when the correlation coefficient K is greater than the predetermined threshold value TH. A table which provides this relationship between the correlation coefficient K and the synthesis ratio α is stored in the flash memory 117. The synthesis ratio α is calculated by referring to the table.

At step S730, the pixel (i, j) of the first image data and the pixel (i+x, j+y) of the second image data are synthesized with the following equation (2). A, B and C represent the pixel value of the pixel (i, j) of the first image data, the pixel value of the pixel (i+x, j+y) of the second image data and the pixel value of the pixel after the synthesis, respectively.

$$C = \alpha \times A + (1-\alpha) \times B \qquad (2)$$

As can be seen from FIG. 8 and the equation (2), when there is high correlation between the pixel (i, j) of the first image data and the pixel (i+x, j+y) of the second image data, that is, when the correlation coefficient K is equal to or smaller than the predetermined threshold value TH, a simple synthesis, i.e., a synthesis with equal ratio (synthesis ratio α=0.5), is performed. On the other hand, when the correlation coefficient K is greater than the predetermined threshold TH, the ratio of the pixel (i, j) of the first image data is increased for synthesis so that the influence of the pixel (i+x, j+y) of the second image data is reduced.

Figure 11:
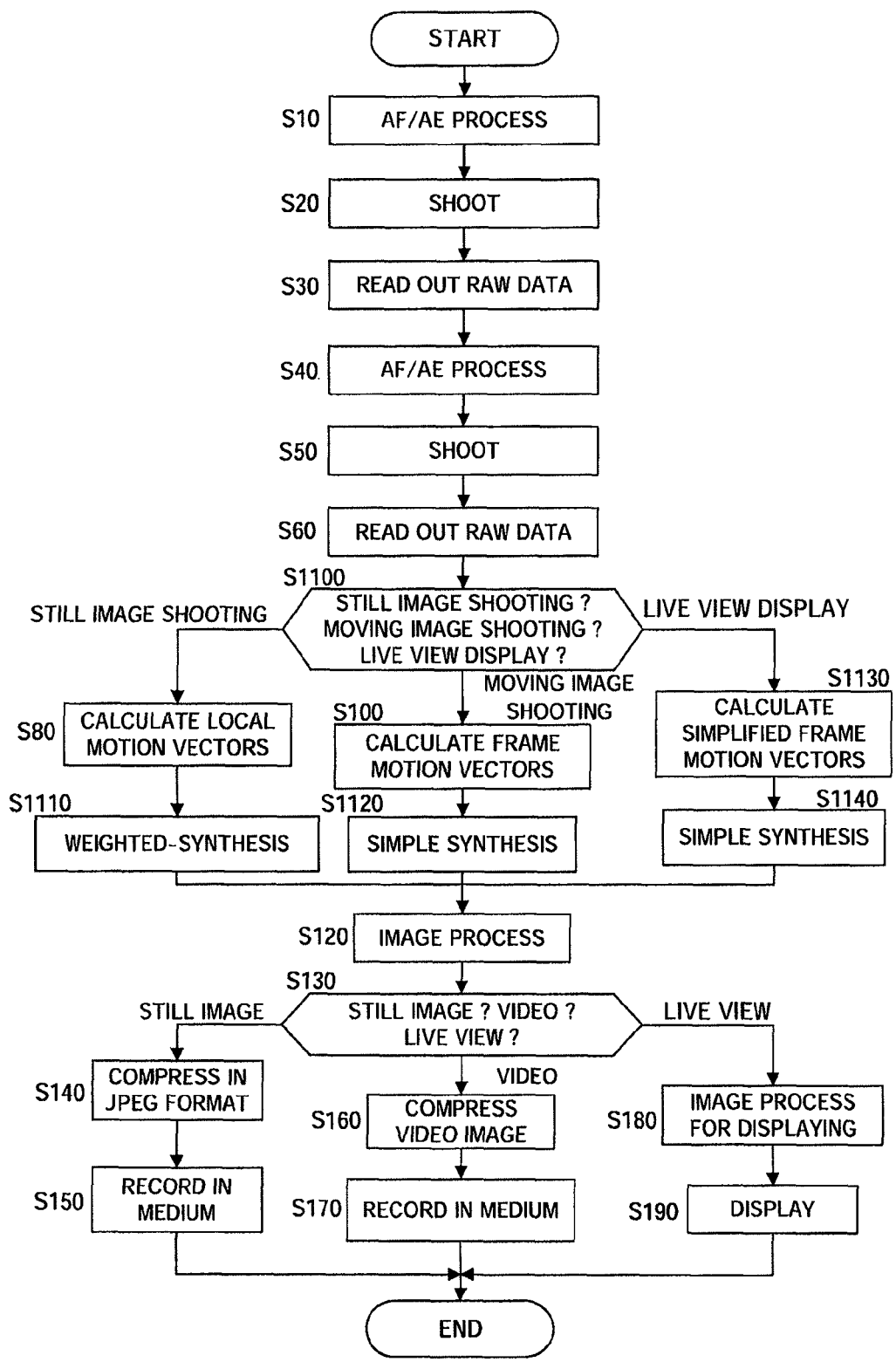
FIG. 11 shows a method performed by an image capturing apparatus according to a second embodiment.

FIG. 11 illustrates examples of the synthesized image based on various synthesis methods under the condition where the positional displacement of the image of a car remains even after a method for correcting the positional displacement between the first image data and the second image data is performed. FIG. 9(a) shows the result obtained by the simple synthesis with the synthesis ratio α=0.5. FIG. 9(b) shows the result obtained by the weighted-synthesis with a synthesis ratio α larger than 0.5. FIG. 9(c) shows the result obtained by the synthesis with the synthesis ratio α=1. As can be seen by comparison with FIG. 9(a) and FIG. 9(b), image blur is reduced when the weighted-synthesis is performed with the synthesis ratio α larger than 0.5 compared to the simple synthesis. There is no image blur with the synthesis ratio α=1 since only the first image data is used.

Referring again to FIG. 6, at step S670, a value "1" is added to the parameter i.

At step S680, it is determined whether the parameter i is equal to or greater than the number of pixels M in the x-axis direction of the first image data. When the parameter i is smaller than M, the process returns to step S610. When the parameter i is equal to or greater than M, the process proceeds to step S690.

At step S690, the parameter i is set to a value "0" and a value "1" is added to the parameter j.

At step S700, it is determined whether the parameter j is equal to or greater than the number of pixels N in the y-axis direction of the first image data. When the parameter j is smaller than N, the process returns to step S610. When the parameter j is equal to or greater than N, the process shown in FIG. 6 is terminated.

Figure 10:
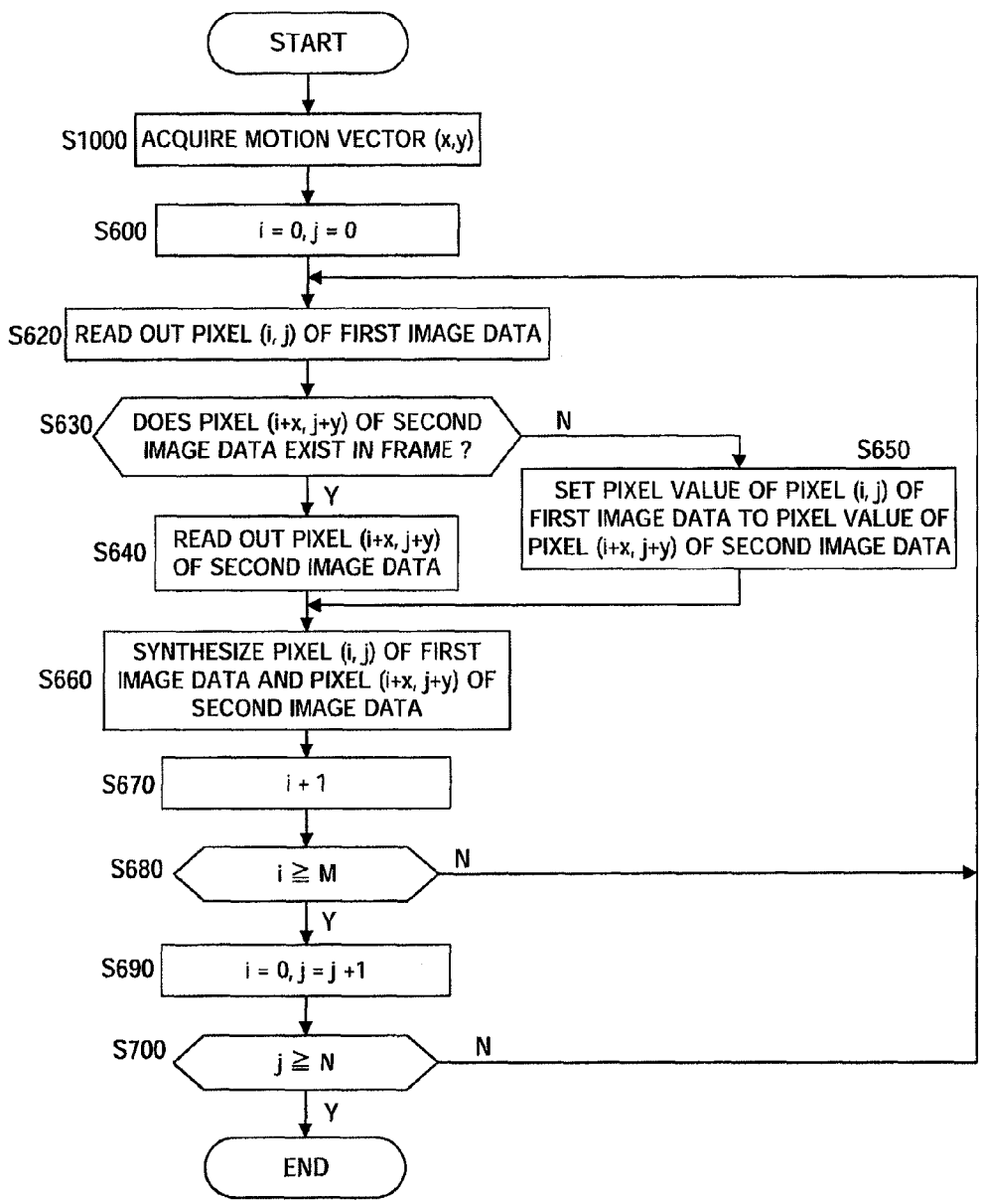
FIG. 10 shows the details of image data synthesis after a positional displacement is performed based on a motion vector of an entire frame.

FIG. 10 shows the process of step S110 in FIG. 5, i.e., the detailed process of synthesizing image data after correcting the positional displacement based on the motion vector of the entire frame. Steps shown in FIG. 10 which have the same reference numbers as steps in FIG. 6 may be performed in an identical or similar manner as the corresponding steps described above with reference to FIG. 6.

At step S1000, the motion vector (x, y) of the entire frame is acquired. For example, the motion vector of the entire frame calculated by the frame motion vector calculation unit 29 in the motion vector calculation unit 119 is recorded in the SDRAM 106. Subsequently, the motion vector (x, y) of the entire frame is read out from the SDRAM 106.

At step S600, parameters i and j indicating the position coordinates of a pixel to be processed are initialized and set to zero, and the process proceeds to step S620. The steps shown in FIG. 10 as being performed after step 620 may be performed in an identical or similar manner as the corresponding steps described above with reference to FIG. 6.

As described above, the digital camera according to the first embodiment generates a synthesized image by correcting positional displacement between a plurality of images obtained by continuous image-capturing and by synthesizing the plurality of the images after correcting the positional displacement. When shooting moving images, the digital camera detects the positional displacement between images using a displacement detecting method different from that for shooting still images. In particular, when shooting moving images, processing time for generating the synthesized image is reduced, and the slowing down of the frame rate is prevented and smooth display of a movie can be achieved. This is due to the fact that, for moving image shooting, the positional displacement between the images is detected by a displacement detecting method, whose processing time is shorter than that for still image shooting.

Additionally, the accuracy of the positional displacement detection when shooting still images is higher than when shooting moving images. Accordingly, the slow-down of movie frame rate is prevented without reducing the image quality of the still image, which is often observed in detail by a user.

Further, for still image shooting, the plurality of displacement amounts corresponding to the positions in the image are detected as the displacement amount among the plurality of the images, while for shooting moving images, a single representative displacement amount is detected as the displacement amount among the plurality of the images. Accordingly, the slow-down of movie frame rate is prevented without reducing the image quality of the still image, which is often observed in detail by a user.

Second Embodiment

The structure of a digital camera according to the second embodiment may the same as or similar to that of the digital camera according to the first embodiment shown in FIG. 1.

FIG. 11 shows a method that may be performed by a digital camera according to the second embodiment. Steps shown in FIG. 11 which have the same reference numbers as steps in FIG. 5 may be performed in an identical or similar manner as the corresponding steps described above with reference to FIG. 5.

At step S1100 of FIG. 11 (which follows step S60), it is determined whether the current process is still image shooting, moving image shooting or live view display. Here, the moving image shooting is a shooting for recording the video data in the recording medium 112. When the process is still image shooting, the process proceeds to step S80. At step S80, the local motion vector calculation unit 30 in the motion vector calculation unit 119 calculates local motion vectors.

At step S1110, the first image data and the second image data are synthesized. Here, after correcting the positional displacement between the first and the second image data based on the local motion vectors calculated at step S80, the first and the second image data are synthesized based on the correlation coefficient between the first image data and the second image data after correcting the positional displacement. If the correlation coefficient is greater than a predetermined threshold value, pixel selection synthesis is performed where the synthesis ratio α of the first image data is set to 1 and the synthesis ratio (1−α) of the second image data is set to 0. The process of synthesizing image data after correcting the positional displacement based on the local motion vectors is the same as the process shown in FIG. 6.

Figure 12:
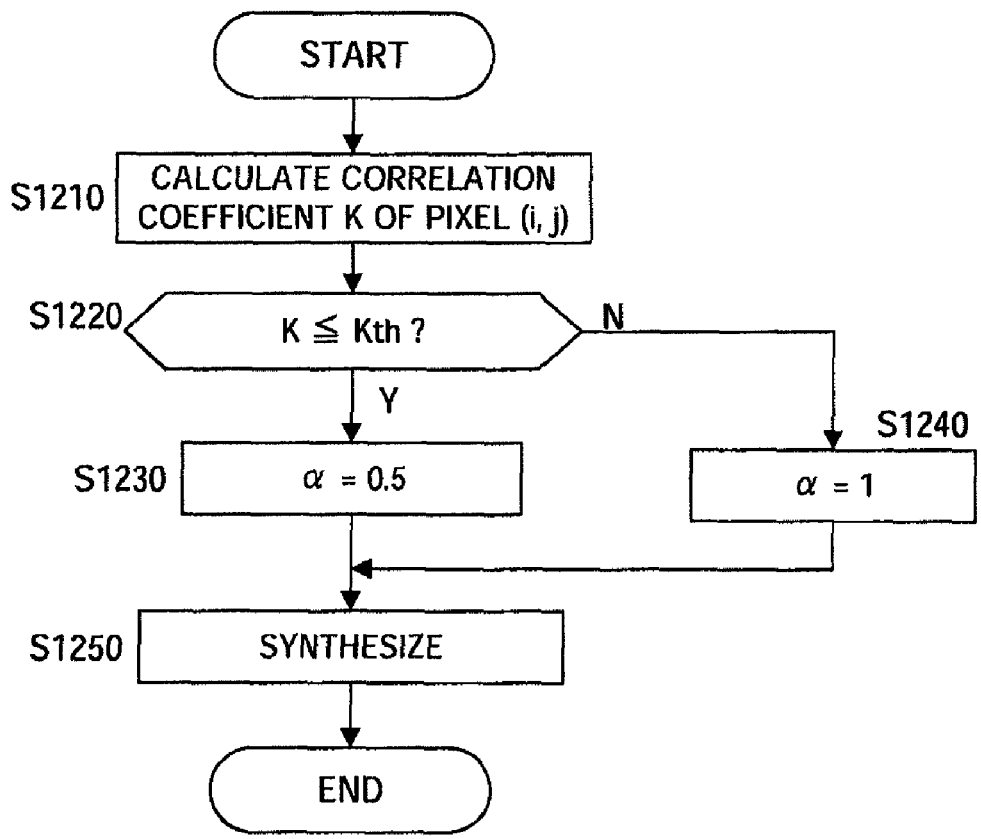
FIG. 12 shows a method for pixel selection synthesis.

FIG. 12 shows further details regarding the process of pixel selection synthesis performed in step S1110 of FIG. 11. At step S1210 in FIG. 12, correlation coefficient K of the pixel (i, j) to be processed is calculated. That is, an absolute value of pixel difference between the pixel (i, j) of the first data and the pixel value (i+x, j+y) of the second data is calculated as the correlation coefficient K.

At step S1220, it is determined whether the correlation coefficient K calculated at step S1210 is equal to or smaller than a predetermined threshold $K_{th}$. When the coefficient K is equal to or smaller than the predetermined threshold $K_{th}$, the process proceeds to step S1230. At step S1230, the synthesis ratio α is set to 0.5.

On the other hand, when it is determined at step S1220 that the coefficient K is greater than the predetermined threshold $K_{th}$, the process proceeds to step S1240. At step S1240, the synthesis ratio α is set to 1.

At step S1250, the pixel (i, j) of the first image data and the pixel (i+x, j+y) of the second image data are synthesized with the above-described equation (2).

When it is determined at step S1100 in FIG. 11 that a moving image is shot, the process proceeds to step S100. At step S100, the frame motion vector calculation unit 29 in the motion vector calculation unit 119 calculates the motion vector of entire frame between the first image data read out at step S30 and the second data read out at step S60.

At step S1120, the first image data and the second image data are synthesized. This process is the same as the process described above as being performed at step S110 in FIG. 5. That is, after correcting the positional displacement between the first image data and the second image data based on the frame motion vector calculated at step S100, the pixel selection synthesis is performed where the first image data and the second image data after correcting the positional displacement are synthesized with a synthesis ratio α of 0.5.

When it is determined at step S1100 that the current process related to a live view display, the process proceeds to step S1130. At step S1130, the frame motion vector calculation unit 29 in the motion vector calculation unit 119 calculates the frame motion vector between the first image data read out at step S30 and the second image data read out at step S60. However, the block size of the reference frame and the comparison frame when divided into the plurality of the blocks (as shown in FIG. 3(a) and FIG. 3(b)) may be larger than that at step S100. Accordingly, there are fewer blocks, the processing load for calculating the motion vectors of the blocks (as can be seen in FIG. 3(g)) lessens, and the calculation time of the motion vectors of the entire frame is reduced.

In this case, image blur may occur since the detection accuracy of the positional displacement for the live view display is lower than that for the moving image shooting for recording the video data. However, this is acceptable because the video data is not recorded in the recording medium 112 and the user may not check the images carefully when displayed as live view. Additionally, the frame rate for live view display can be improved by lowering the detection accuracy of the positional displacement and reducing the processing time.

At step S1140, the first image data and the second image data are synthesized. The synthesis performed at step S1140 may be the same or a similar process as the process described above as performed at step S1120. The steps shown in FIG. 11 as being performed after step S120 may be performed in an identical or similar as the corresponding steps described above with reference to FIG. 5.

As described above, the digital camera according to the second embodiment detects the positional displacement between images such that the positional displacement for the live view display has lower detection accuracy than the detection accuracy for when moving images are recorded. Accordingly, frame rate is improved by reducing time to generate the synthesized image when displaying the live view.

Alternatively or additionally, the digital camera of the second embodiment may perform variations on the method of FIG. 11 described above. As described above, the digital camera may perform simple synthesis when shooting the moving images and displaying the live view (step S1120 and step S1140). However, in a variation on the method shown in FIG. 11, the digital camera may perform weighted synthesis when shooting the moving images and perform simple synthesis when displaying the live view. This may have the effect that the images generated when shooting moving images may include less blur than the images displayed in the live view.

For the pixel selection synthesis at step S1110 in FIG. 11, the synthesis ratio α is set to 1 when the coefficient K is greater the predetermined threshold $K_{th}$, and the synthesis ratio α is set to 0.5 when the coefficient K is equal to or smaller than the predetermined threshold $K_{th}$. However, the synthesis ratio α may be set to 1 when the coefficient K is equal to the predetermined threshold $K_{th}$ and the synthesis ratio α may be gradually decreased from 1 to the lowest value 0.5 concurrently as the coefficient K becomes gradually smaller than the predetermined threshold $K_{th}$.

In the above-described first and second embodiments, the synthesis was applied to RAW data. However, instead of RAW data, the synthesis may be applied to image data after image processing such as demosaicing.

The motion vector calculation unit 119 shown in FIG. 2 may include a color signal extraction unit which extracts color signals of the reference frame and the comparison frame instead of the brightness extraction units 21 and 24, for example. Thus, the correlation between the reference frame and the comparison frame may be obtained by elements other than just the brightness.

In the above-described embodiments, examples of synthesizing the plurality of the images shot with different exposure times were described for generating the image with an extended dynamic range. However, the methods and features described above may also be applied to reduce noise in a plurality of images, and/or produce other image correction effects.

In the above-described embodiments, features and methods are described as being performed by one or more digital cameras. The digital cameras are provided above only as examples, and the features and methods described above may be implemented in any appropriate combination of hardware and/or software. For example, one or more software programs may perform the features and methods described above with respect to the first and/or second embodiments. As one example, a computer may include a processor, a main memory unit (such as a RAM), and a computer-readable medium that stores one or more programs which, when executed by the processor, perform all or any combination of the features described above with reference to the first and second embodiments. The computer-readable medium may be, for example, a magnetic disk, a magnetic optical disk, CD-ROM, DVD-ROM, or a semiconductor memory. The processor may read the one or more programs stored in the computer-readable storage medium, and execute the information processing and calculations for generating a synthesized image described above. The processor may store synthesized images in a memory device such as a RAM or magnetic disk, or in a computer-readable medium such as a CD-ROM, DVD-ROM. The one or more programs may be received by the computer via one or more wired or wireless networks, and then stored in the computer-readable medium.

Although features and elements are described above in particular combinations, each feature or element can be used alone or in any combination with the other features and elements. For example, each feature or element as described above with may be used alone without the other features and elements or in various combinations with or without other features and elements. Sub-elements of the methods and features described above may be performed in any arbitrary order (including concurrently), in any combination or sub-combination.

The present invention is not limited to the above-described embodiments. Various modifications and applications of the above-described embodiments are within the scope of this invention. While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but to cover all modifications that may fall within the scope of the appended claims.

What is claimed is:

1. An image capturing apparatus for generating a synthesized image from a first image and a second image obtained by continuous image-capturing, the image capturing apparatus comprising:
    a displacement detection unit configured to detect a positional displacement between the first image and the second image;
    an image-capturing mode determination unit configured to determine whether the first image and the second image were captured in a still image mode;
    a control unit configured:
        to direct the displacement detection unit to detect the positional displacement between the first image and the second image using a first displacement detection method in response to a determination by the image-capturing mode determination unit that the first image and the second image were captured in the still image mode; and
        to direct the displacement detection unit to detect the positional displacement between the first image and the second image using a second displacement detection method in response to a determination by the image-capturing mode determination unit that the first image and the second image were not captured in the still image mode,
        wherein the second displacement detection method is different from the first displacement detection method, the first displacement method includes the use of local motion vectors to detect the positional displacement between the first image and the second image and the second displacement detection method includes the use of a frame motion vector to detect the positional displacement between the first image and the second image; and
    a synthesis unit configured to generate the synthesized image by synthesizing the first image and the second image based on the detected positional displacement.

2. The image capturing apparatus according to claim 1, wherein processing time for the first displacement detection method is longer than processing time for the second displacement detection method.

3. The image capturing apparatus according to claim 1, wherein accuracy of the first displacement detection method is higher than accuracy of the second displacement detection method.

4. An image capturing apparatus for generating a synthesized image from a first image and a second image obtained by continuous image-capturing, the image capturing apparatus comprising:
    a displacement detection unit configured to detect a positional displacement between the first image and the second image;
    an image-capturing mode determination unit configured to determine whether the first image and the second image were captured in a still image mode;
    a control unit configured:
        to direct the displacement detection unit to detect the positional displacement between the first image and the second image using a first displacement detection method in response to a determination by the image-capturing mode determination unit that the first image and the second image were captured in the still image mode; and
        to direct the displacement detection unit to detect the positional displacement between the first image and the second image using a second displacement detection method in response to a determination by the image-capturing mode determination unit that the first image and the second image were not captured in the still image mode,
        wherein the second displacement detection method is different from the first displacement detection method; and
    a synthesis unit configured to generate the synthesized image by synthesizing the first image and the second image based on the detected positional displacement;
    wherein the synthesis unit is configured to use a first synthesis method for synthesizing the first image and the second image when the first image and the second image were captured in the still image mode, and
    the synthesis unit is configured to use a second synthesis method for synthesizing the first image and the second image when the first image and the second image were not captured in the still image mode, wherein the second synthesis method and the first synthesis method are different.

5. The image capturing apparatus according to claim 4, wherein the first synthesis method utilizes a weighted synthesis method and wherein the second synthesis method is a simple synthesis method.

6. The image capturing apparatus according to claim 4 wherein the synthesized image includes less image blur when generated by the first synthesis method than when generated by the second synthesis method.

7. The image capturing apparatus according to claim 1 wherein
    the first image is obtained using a first exposure time,
    the second image is obtained using a second exposure time, and
    the first exposure time and the second exposure time are different.

8. An image capturing apparatus for generating a synthesized image from a first image and a second image obtained by continuous image-capturing, the image capturing apparatus comprising:
    a displacement detection unit configured to detect a positional displacement between the first image and the second image;
    an image-capturing mode determination unit configured to determine whether the first image and the second image were captured in a still image mode;
    a control unit configured:
        to direct the displacement detection unit to detect the positional displacement between the first image and the second image using a first displacement detection method in response to a determination by the image-capturing mode determination unit that the first image and the second image were captured in the still image mode; and
        to direct the displacement detection unit to detect the positional displacement between the first image and the second image using a second displacement detection method in response to a determination by the image-capturing mode determination unit that the first image and the second image were not captured in the still image mode,
wherein the second displacement detection method is different from the first displacement detection method; and
a synthesis unit configured to generate the synthesized image by synthesizing the first image and the second image based on the detected positional displacement;
wherein the image-capturing mode determination unit is further configured to determine whether the first image and the second image were captured in a movie mode or a live view display mode, and the displacement detection unit is configured:
to detect the positional displacement between the first image and the second image using a larger block size when the first image and the second image were captured in the live view display mode, and
to detect the positional displacement between the first image and the second image using a smaller block size when the first image and the second image were captured in the movie mode.

9. The image capturing apparatus according to claim 1, wherein the displacement detection unit includes at least
a first displacement detection unit configured to detect the positional displacement between the first image and the second image using the first displacement detection method, and
a second displacement detection unit configured to detect the positional displacement between the first image and the second image using the second displacement detection method, wherein
the control unit is configured
to direct the first displacement detection unit to detect the positional displacement between the first image and the second image using the first displacement detection method in response to the determination by the image-capturing mode determination unit that the first image and the second image were captured in the still image mode, and
to direct the second displacement detection unit to detect the positional displacement between the first image and the second image using the second displacement detection method in response to the determination by the image-capturing mode determination unit that the first image and the second image were not captured in the still image mode.

10. The image capturing apparatus according to claim 1, further comprising:
a displacement correction unit configured to align the first image and the second image based on the detected positional displacement;
wherein the synthesis unit is configured to generate the synthesized image by synthesizing the aligned first image and the second image based on the detected positional displacement.

11. The image capturing apparatus according to claim 1, further comprising:
an image sensor configured to capture the first image and the second image; and
a recording medium configured to store the synthesized image.

12. The image capturing apparatus according to claim 1, wherein the image capturing apparatus is a digital camera.

13. A method for generating a synthesized image from a first image and a second image obtained by continuous image-capturing, the method comprising:
an image sensor capturing the first image and the second image;
determining whether the first image and the second image were captured in a still image mode;
detecting a positional displacement between the first image and the second image, wherein
the detecting the positional displacement between the first image and the second image is performed using a first displacement detection method when the first image and the second image were captured in the still image mode, and
the detecting the positional displacement between the first image and the second image is performed using a second displacement detection method when the first image and the second image were not captured in the still image mode,
wherein the second displacement detection method is different from the first displacement detection method, the first displacement method includes the use of local motion vectors to detect the positional displacement between the first image and the second image and the second displacement detection method includes the use of a frame motion vector to detect the positional displacement between the first image and the second image; and
generating the synthesized image by synthesizing the first image and the second image based on the detected positional displacement.

14. A computer-readable medium having processor-executable instructions stored thereon which, when executed by a processor, will cause the processor to perform a method for generating a synthesized image from a first image and a second image obtained by continuous image-capturing, the method comprising:
the processor determining whether the first image and the second image were captured in a still image mode;
the processor detecting a positional displacement between the first image and the second image, wherein
the detecting the positional displacement between the first image and the second image is performed using a first displacement detection method when the first image and the second image were captured in the still image mode, and
the detecting the positional displacement between the first image and the second image is performed using a second displacement detection method when the first image and the second image were not captured in the still image mode,
wherein the second displacement detection method is different from the first displacement detection method, the first displacement method includes the use of local motion vectors to detect the positional displacement between the first image and the second image and the second displacement detection method includes the use of a frame motion vector to detect the positional displacement between the first image and the second image; and
the processor generating the synthesized image by synthesizing the first image and the second image based on the detected positional displacement.

* * * * *